United States Patent
Uchiyama et al.

[11] Patent Number: 6,158,746
[45] Date of Patent: Dec. 12, 2000

[54] SUSPENSION CONTROL APPARATUS

[75] Inventors: Masaaki Uchiyama, Tokyo; Nobuyuki Ichimaru, Kanagawa-ken, both of Japan

[73] Assignee: Tokico, Ltd., Kanagawa-ken, Japan

[21] Appl. No.: 09/273,264

[22] Filed: Mar. 22, 1999

[30] Foreign Application Priority Data

Mar. 31, 1998 [JP] Japan .................................. 10-086636

[51] Int. Cl.[7] .................................................. B60G 17/15
[52] U.S. Cl. .................................. 280/5.503; 280/5.508; 280/5.512; 701/38
[58] Field of Search ........................... 280/5.503, 5.508, 280/5.51, 5.512; 701/38

[56] References Cited

U.S. PATENT DOCUMENTS

| | | | |
|---|---|---|---|
| 5,072,392 | 12/1991 | Taniguchi .............................. | 280/5.508 |
| 5,163,704 | 11/1992 | Wada ..................................... | 280/5.503 |
| 5,367,459 | 11/1994 | Shtarkman et al. .................. | 280/5.512 |
| 5,519,611 | 5/1996 | Tagawa et al. ........................ | 280/5.51 |
| 5,948,028 | 9/1999 | Raad .................................... | 280/5.512 |

Primary Examiner—Lanna Mai
Assistant Examiner—Ruth Ilan
Attorney, Agent, or Firm—Wenderoth, Lind & Ponack, L.L.P.

[57] ABSTRACT

In the suspension control apparatus of the present invention, when a lateral acceleration differential value falls outside a lateral acceleration differential value range, a controller calculates a control input for an actuator, based on the lateral acceleration differential value, in preference to a lateral acceleration. Therefore, immediately after the start of rolling of a vehicle and just prior to the end of the rolling when the lateral acceleration differential value falls outside the lateral acceleration differential value range, the control input for the actuator is calculated based on the lateral acceleration differential value. By this arrangement, it is possible to suppress any uncomfortable sensation which is likely to be transmitted to an occupant of the vehicle immediately after the start of rolling and just prior to the end of rolling in a conventional technique, in which the control input for the actuator is calculated by adding the control input varying in proportion to the lateral acceleration and the control input varying in proportion to the lateral acceleration differential value.

2 Claims, 10 Drawing Sheets

SUSPENSION CONTROL APPARATUS

BACKGROUND OF THE INVENTION

The present invention relates to a suspension control apparatus for a vehicle.

As a conventional suspension control apparatus for a vehicle, there can be mentioned an apparatus comprising: a damper provided between a vehicle body and a vehicle wheel to generate a variable damping force; an actuator for controlling the damper; a lateral acceleration sensor for detecting a lateral acceleration of the vehicle body; lateral acceleration differential value detecting means for determining a lateral acceleration differential value by differentiating the lateral acceleration detected by the lateral acceleration sensor; a controller for calculating a control input for the actuator, based on the lateral acceleration and the lateral acceleration differential value and operating the actuator in accordance with the control input, to thereby control the damper to generate a desired damping force, so as to suppress rolling motion of the vehicle body. In order to calculate the control input for the actuator, the controller in this apparatus calculates a control input varying in proportion to the lateral acceleration and also calculates a control input varying in proportion to the lateral acceleration differential value. The controller adds these control inputs to thereby determine a total control input, and operates the actuator in accordance with the total control input.

Referring to FIG. 7, explanation is given below of a function of the above-mentioned controller, assuming that the vehicle rolls during turning, and a lateral acceleration a varying as shown in graph (a) of FIG. 7 has been detected by the lateral acceleration sensor. When the lateral acceleration a varying as shown in graph (a) of FIG. 7 has been detected, the controller calculates a control input for the actuator such as indicated by a dotted line $T(\Delta\alpha)$ in graph (b) of FIG. 7, which varies in proportion to a lateral acceleration differential value $\Delta\alpha$ calculated from the lateral acceleration $\alpha$. The controller also calculates a control input for the actuator such as indicated by a dotted line $T(\alpha)$ in graph (c) of FIG. 7, which varies in proportion to the lateral acceleration $\alpha$. Further, the controller adds these two control inputs, to thereby determine a total control input such as indicated by a dotted line $T(S)$ in graph (d) of FIG. 7 $[T(S)=T(\Delta\alpha)+T(\alpha)]$. The controller operates the actuator, based on the thus determined total control input varying as indicated by the dotted line $T(S)$ in graph (d) of FIG. 7.

In many control systems of this type, the lateral acceleration $\alpha$ is mainly used for a feedback signal for a feedback (F. B.) system, while the lateral acceleration differential value $\Delta\alpha$ is used for a feedforward signal for a feedforward (F. F.) system. With respect to the control input for the actuator, the control input on the basis of the lateral acceleration $\alpha$ and the control input on the basis of the lateral acceleration differential value $\Delta\alpha$ are hereinafter frequently referred to as "F. B. control inputs" and "F. F. control input", respectively.

In the above-mentioned conventional suspension control apparatus, immediately after the start of rolling motion of the vehicle and just prior to the end of the rolling motion, the lateral acceleration differential value $\Delta\alpha$ and hence the control input varying in proportion to the lateral acceleration differential value $\Delta\alpha$ increases as indicated by the dotted line $T(\Delta\alpha)$ in graph (b) of FIG. 7. Therefore, the total control input sharply increases immediately after the start of the rolling motion as indicated by the dotted line $T(S)$ in graph (d) of FIG. 7. This leads to a rapid change in damping force, which imparts an occupant of the vehicle with queer and uncomfortable feel. It should be noted that in each of graphs (b) to (d) of FIG. 7, the control input is indicated above and below the abscissa because the directions of damping forces around at the time when the rolling motion starts and around at the time when the rolling motion ends are opposite (extension stroke and compression stroke).

SUMMARY OF THE INVENTION

In view of the above, the present invention has been made. It is a primary object of the present invention to provide a suspension control apparatus which is capable of performing suppression of rolling motion of a vehicle in an appropriate manner and providing the vehicle with a satisfactory ride.

According to the present invention, there is provided a suspension control apparatus comprising:

an actuator for controlling a damper provided in a vehicle, the damper being adapted to generate a variable damping force;

lateral acceleration detecting means for detecting a lateral acceleration of the vehicle;

lateral acceleration differential value calculating means for determining a lateral acceleration differential value by differentiating the lateral acceleration detected by the lateral acceleration detecting means; and a controller for controlling the actuator, based on the lateral acceleration and the lateral acceleration differential value, whereby when the lateral acceleration differential value determined by the lateral acceleration differential value calculating means falls outside a predetermined lateral acceleration differential value range, the controller controls the actuator by way of a preference setting such that a control input for the actuator is calculated based on the lateral acceleration differential value, in preference to the lateral acceleration.

Further, according to the present invention, there is provided the above-mentioned suspension control apparatus wherein when the lateral acceleration differential value determined by the lateral acceleration differential value calculating means falls within the predetermined lateral acceleration differential value range and the lateral acceleration detected by the lateral acceleration detecting means falls outside a predetermined lateral acceleration range, measurement of time is conducted and when a value measured by the measurement of time reaches a predetermined value, the control input for the actuator is set so as to enable the damper to perform soft damping, while the preference setting of the control input for the actuator is canceled.

The foregoing and other objects, features and advantages will be apparent to those skilled in the art from the following detailed description and claims taken in connection with the accompanying drawings.

DETAILED DESCRIPTION OF THE INVENTION

Hereinbelow, referring to FIGS. 1 to 7, explanation is given of a suspension control apparatus for a vehicle, according to a first embodiment of the present invention.

Figure 1:
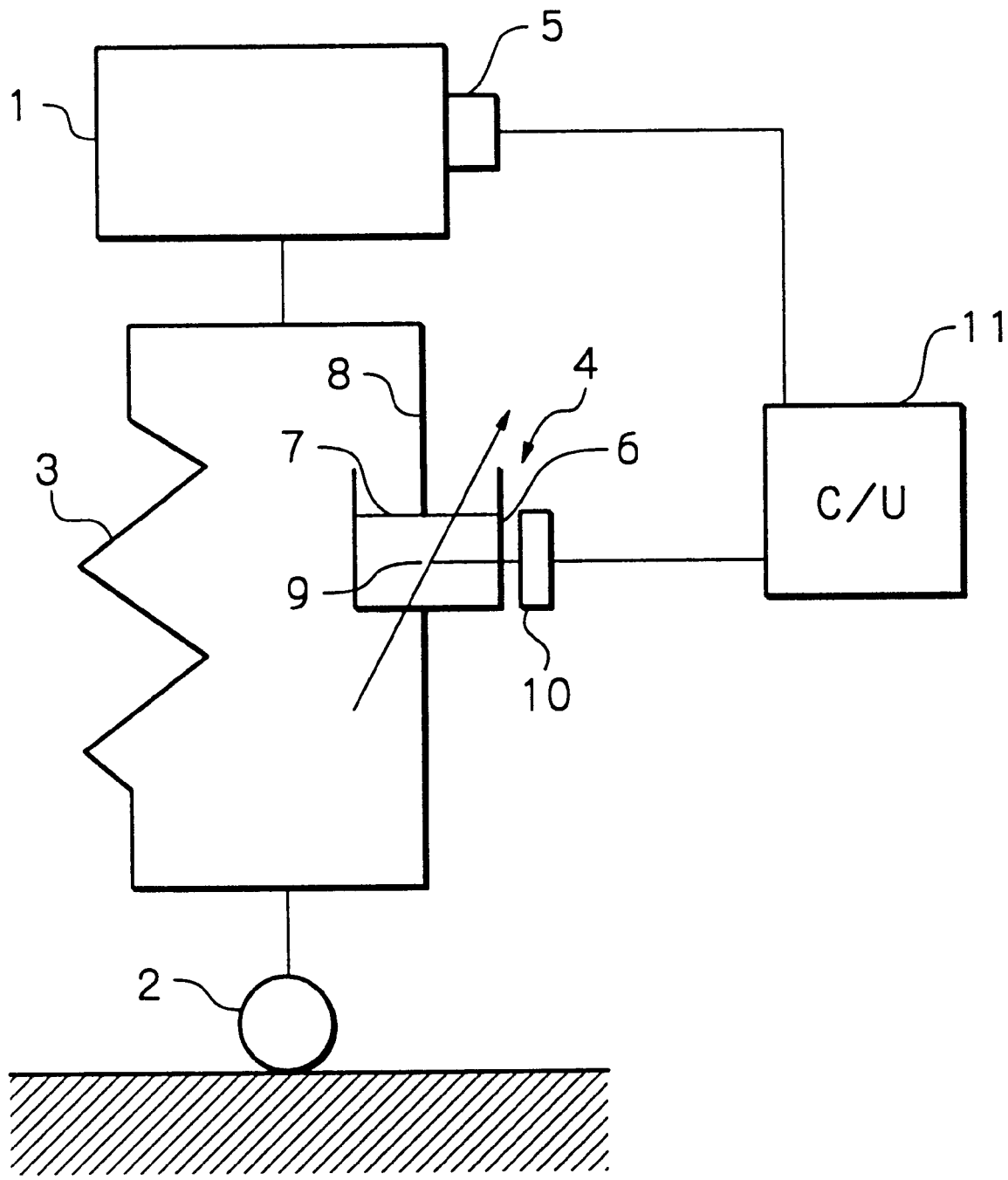
FIG. 1 is a schematic illustration showing a suspension control apparatus according to a first embodiment of the present invention.
Figure 2:
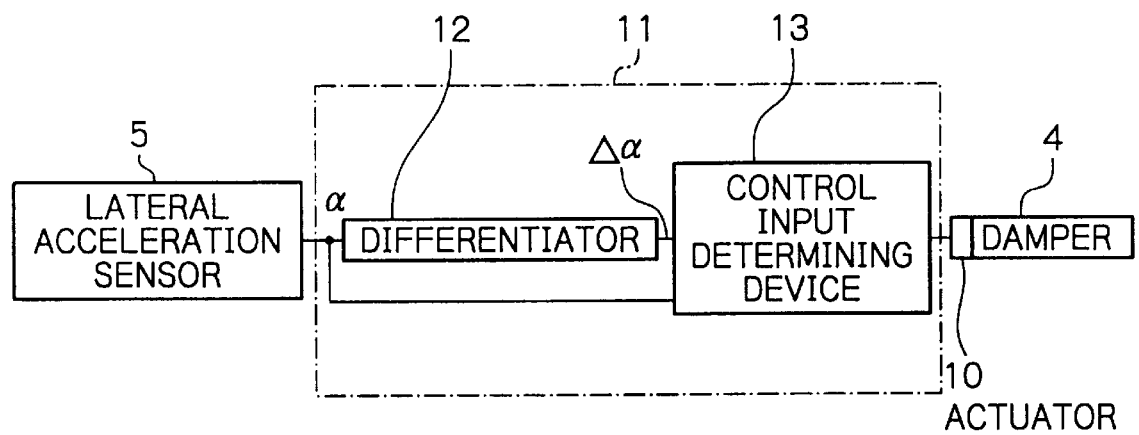
FIG. 2 is a block diagram showing an arrangement of a controller shown in FIG. 1.

In FIG. 1, a spring 3 and a damper 4 are arranged laterally between a vehicle body (sprung mass) 1 and a vehicle wheel (unsprung mass) 2 while supporting the vehicle body 1. (Actually, the spring 3 and the damper 4 are provided between the vehicle body 1 and each of four vehicle wheels 2. However, for the sake of convenience, only one vehicle wheel 2 is shown in FIG. 1.) A lateral acceleration sensor (lateral acceleration detecting means) 5 is connected to the vehicle body 1 for detecting an acceleration α acting laterally on the vehicle body 1 (hereinafter, referred to as "lateral acceleration α").

The damper 4 generally comprises: a cylinder 6 in which a hydraulic fluid is sealably contained; a piston 7 slidably contained in the cylinder 6; a piston rod 8 having one end connected to the piston 7; a damping force generating portion 9 provided in the piston 7 or the cylinder 6 to generate a damping force which varies in accordance with the amount of displacement of a movable member (not shown); and an actuator 10 for displacing the movable member in accordance with a control input which is described later in detail. In this embodiment, the cylinder 6 is fixed to a wheel supporting structure for the vehicle wheel 2 and the other end of the piston rod 8 is fixed to the vehicle body 1.

The lateral acceleration sensor 5 and the actuator 10 are connected to a controller 11. The controller 11 comprises: a differentiator (lateral acceleration differential value calculating means) 12 for determining a lateral acceleration differential value Δα (hereinafter, frequently referred to simply as "differential value Δα") by differentiating a detection signal (lateral acceleration α) from the lateral acceleration sensor 5; and a control input determining device 13 to which the detection signal (lateral acceleration α) from the lateral acceleration sensor 5 and the differential value Δα are inputted to determine a control input for the actuator 10, based on the lateral acceleration α or the differential value Δα. The controller 11 performs processing as described later in detail, and operates the actuator 10 in accordance with the control input, to thereby enable the damper 4 to generate a desired damping force (corresponding to the control input).

Incidentally, with respect to the damper 4 and the spring 3, four dampers 4 and four springs 3 are actually provided, corresponding to four vehicle wheels 2. However, for the sake of convenience, only one damper 4 and one spring 3 are shown in FIG. 1. Rolling motion of the vehicle is suppressed by adjustment such that, for example, when the vehicle turns to the left, the dampers 4 located forward relative to the direction of the rolling motion (right-handed dampers) perform firm damping during a compression stroke, and the dampers 4 located rearward relative to the direction of the rolling motion (left-handed dampers) perform firm damping during an extension stroke.

Figure 3:
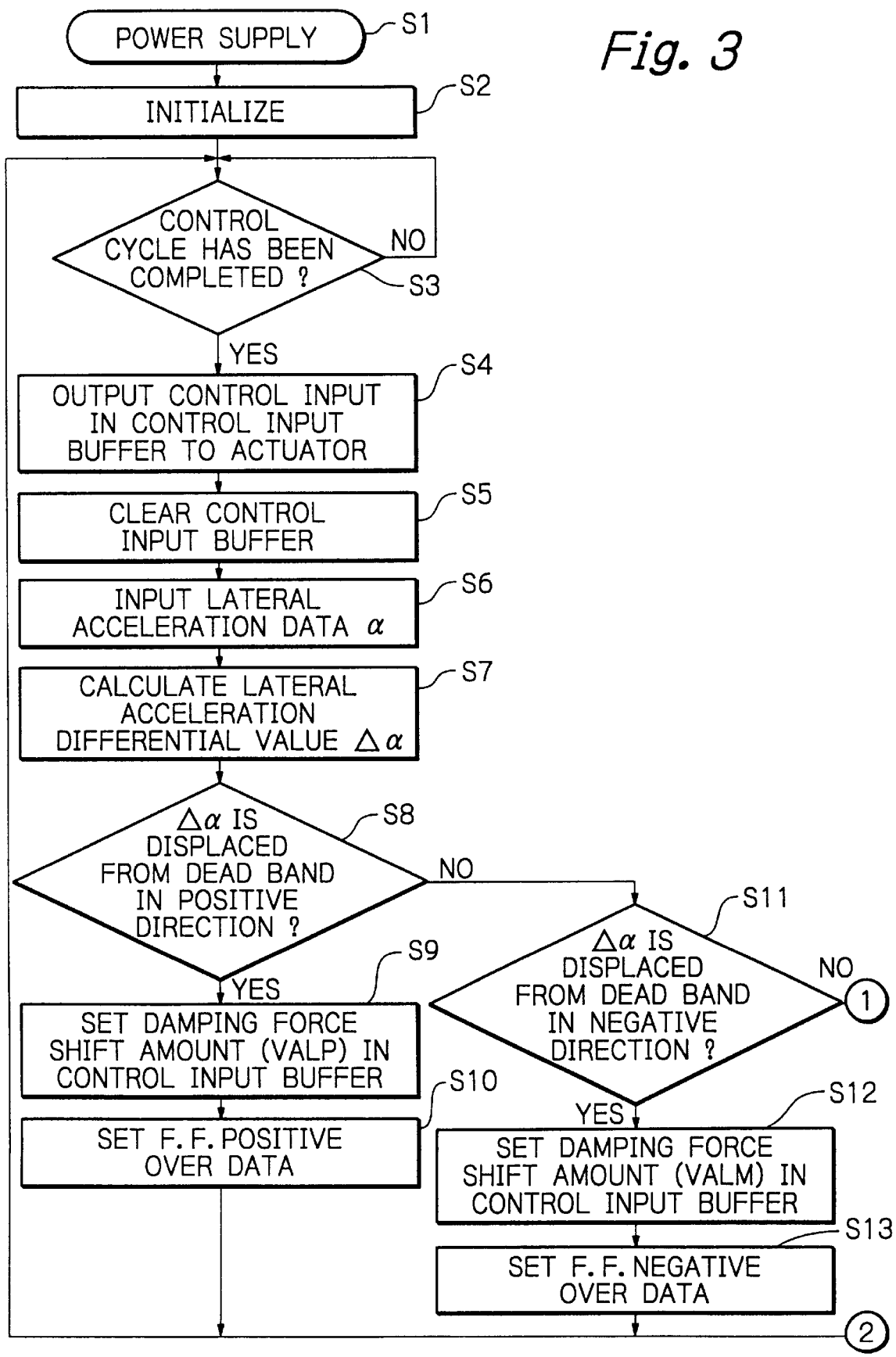
FIG. 3 is a flow chart of showing the content of processing by the controller shown in FIG. 1.
Figure 4:
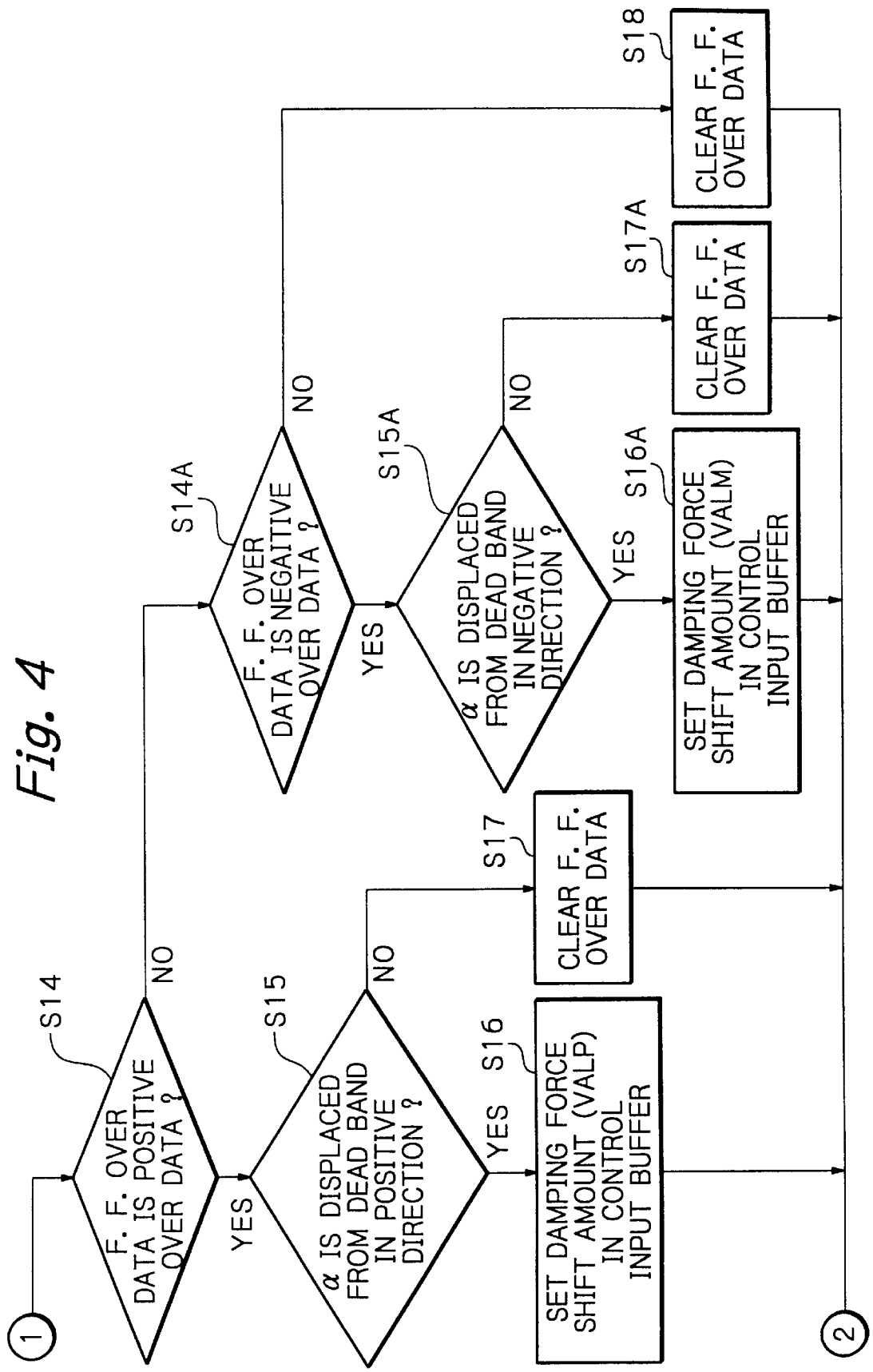
FIG. 4 is a flow chart continued from the flow chart of FIG. 3.

The controller 11 performs processing as shown in a flow chart of FIGS. 3 and 4. First, when power is supplied to the controller 11 by operation of an ignition switch (not shown) (step S1), the controller 11 is initialized (step S2). Subsequently, an inquiry is made as to whether or not a control cycle has been completed (step S3). If the answer in step S3 is YES (a control cycle has been completed), a control input [total control input: a solid line G(S) in graph (d) of FIG. 7] which was stored in a control input buffer (not shown) in the previous control cycle is outputted to the actuator 10 (step S4).

Subsequently, the data (control input) stored in the control input buffer is temporarily cleared (step S5).

Then, a detection signal (lateral acceleration α) is inputted from the lateral acceleration sensor 5 to the controller 11 (step S6). Then, the differentiator 12 calculates a lateral acceleration differential value Δα (step S7).

Next, an inquiry is made as to whether or not the differential value Δα is displaced from a dead band (lateral acceleration differential value range) $\Delta\alpha_{00}$ (hereinafter, frequently referred to as "differential value dead band $\Delta\alpha_{00}$") in the positive direction (step S8).

Figure 5:
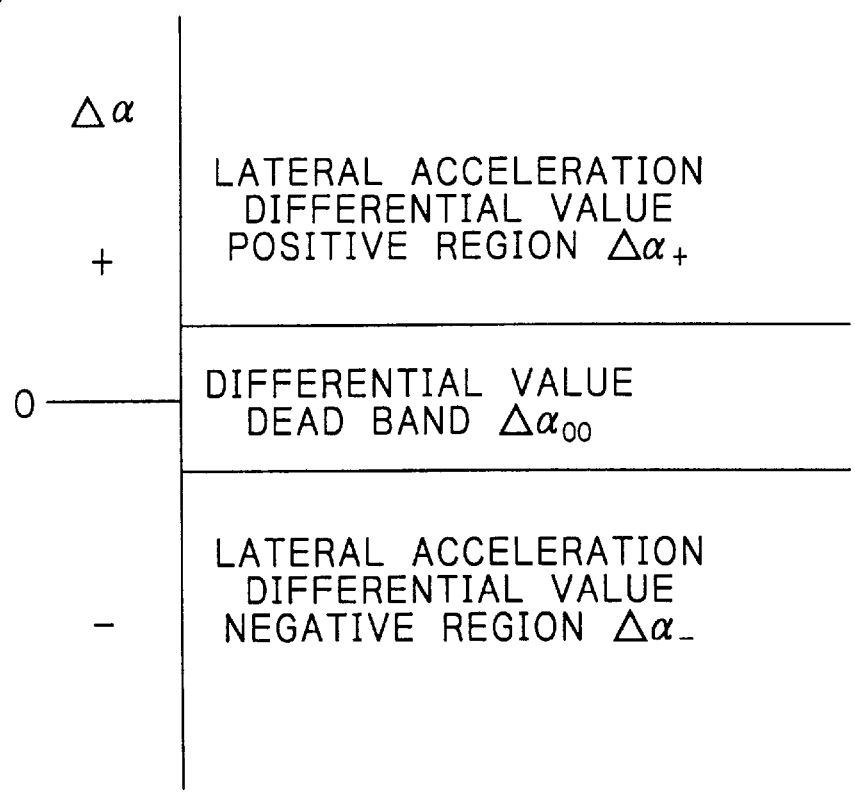
FIG. 5 is a schematic diagram showing three regions of a lateral acceleration differential value.

Now, referring to FIG. 5, FIG. 5 schematically shows the differential value dead band $\Delta\alpha_{00}$ and a region $\Delta\alpha_+$ lying on a positive side relative to the differential value dead band $\Delta\alpha_{00}$ (hereinafter, referred to as "differential value positive region $\Delta\alpha_+$"). In FIG. 5, a region $\Delta\alpha_-$ (hereinafter, referred to as "differential value negative region $\Delta\alpha_-$") is a region lying on a negative side relative to the differential value dead band $\Delta\alpha_{00}$. That is, in step S8, an inquiry is made as to whether the differential value Δα falls within the differential value positive region $\Delta\alpha_+$ (YES) or falls within the differential value dead band $\Delta\alpha_{00}$ or the differential value negative region $\Delta\alpha_-$ (NO).

If the answer in step S8 is YES (the differential value Δα falls within the differential value positive region $\Delta\alpha_+$), a damping force positive shift amount VALP which is predetermined (hereinafter, frequently referred to as "damping force shift amount VALP") is selected as a control input, and is stored in the control input buffer (step S9).

It should be noted that if neither of the damping force positive shift amount VALP or a damping force negative shift amount VALM is adopted as a control input, the actuator 10 is controlled in accordance with a control input (VALP or VALM) calculated based on the lateral acceleration α (step S4), as described later. If neither of the damping force positive shift amount VALP or the damping force negative shift amount VALM is adopted and no control input calculated based on the lateral acceleration α is set, the control input is cleared and the control input is regarded as zero so that the damper 4 is controlled to perform soft damping.

After step S9, positive over data indicating that the differential value Δα is displaced from the differential value dead band $\Delta\alpha_{00}$ in the positive direction (hereinafter, frequently referred to as "F. F. positive over data") is set (step S10), and the program returns to step S3.

If the answer in step S8 is NO (the differential value $\Delta\alpha$ falls within the differential value dead band $\Delta\alpha_{00}$ or the differential value negative region $\Delta\alpha_-$), a further inquiry is made as to whether or not the differential value $\Delta\alpha$ is displaced from the differential value dead band $\Delta\alpha_{00}$ in the negative direction, that is, whether the differential value $\Delta\alpha$ falls within the differential value negative region $\Delta\alpha_-$ (YES) or falls within the differential value dead band $\Delta\alpha_{00}$ (NO) (step S11).

If the answer in step S11 is YES (the differential value $\Delta\alpha$ falls within the differential value negative region $\Delta\alpha_-$), the damping force negative shift amount VALM (hereinafter, frequently referred to as "damping force shift amount VALM) is adopted as a control input, and is stored in the control input buffer (step S12).

After step S12, negative over data indicating that the differential value $\Delta\alpha$ is displaced from the differential value dead band $\Delta\alpha_{00}$ in the negative direction (hereinafter, referred to as "F. F. negative over data") is set (step S13), and the program returns to step S3. The F. F. positive over data and the F. F. negative over data are hereinafter frequently referred to as "over data", collectively.

If the answer in step S11 is NO (the differential value $\Delta\alpha$ falls within the differential value dead band $\Delta\alpha_{00}$), a further inquiry is made as to whether or not the over data is positive over data (step S14).

If the answer in step S14 is YES (the over data is positive over data), a further inquiry is made as to whether or not the lateral acceleration $\alpha$ is displaced from a dead band (lateral acceleration range) $\alpha_{00}$ (hereinafter, frequently referred to as "lateral acceleration dead band $\alpha_{00}$") in the positive direction (step S15).

Figure 6:
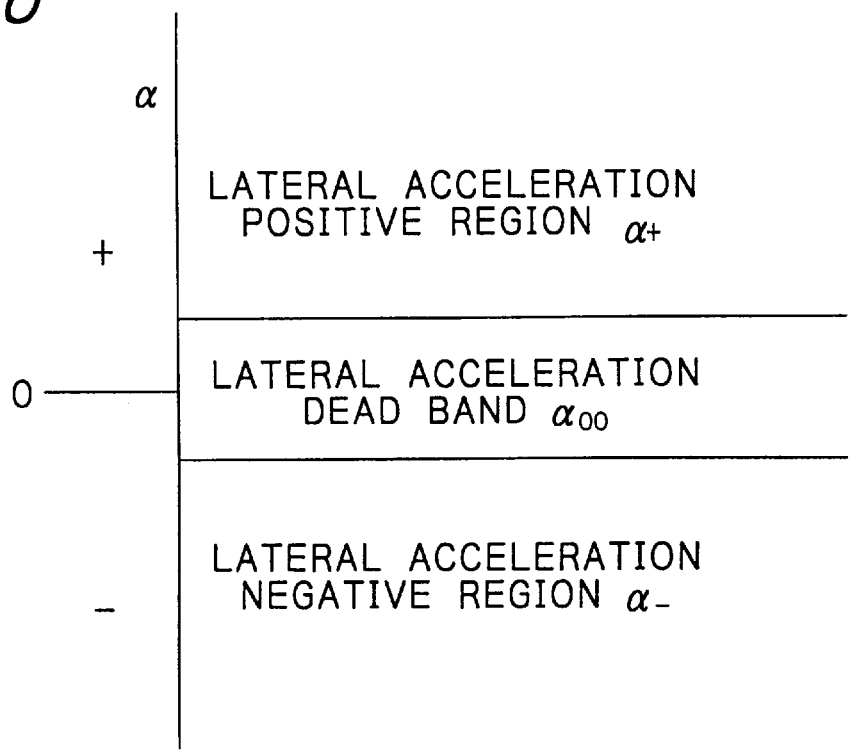
FIG. 6 is a schematic diagram showing three regions of a lateral acceleration.

Now, referring to FIG. 6, FIG. 6 schematically shows the lateral acceleration dead band $\alpha_{00}$ and a region $\alpha_+$ lying on a positive side relative to the lateral acceleration dead band $\alpha_{00}$ (hereinafter, referred to as "lateral acceleration positive region $\alpha_+$"). In FIG. 6, a region $\alpha_-$ (hereinafter, referred to as "lateral acceleration negative region $\alpha_-$") is a region lying on a negative side relative to the lateral acceleration dead band $\alpha_{00}$. That is, in step S15, an inquiry is made as to whether the lateral acceleration $\alpha$ falls within the lateral acceleration positive region $\alpha_+$ (YES) or falls within the lateral acceleration dead band $\alpha_{00}$ or the lateral acceleration negative region $\alpha_-$ (NO).

If the answer in step S15 is YES (the lateral acceleration $\alpha$ falls within the lateral acceleration positive region $\alpha_+$), the damping force positive shift amount VALP is adopted as a control input, and is stored in the control input buffer (step S16). Then, the program returns to step S3.

If the answer in step S15 is NO (the lateral acceleration $\alpha$ falls within the lateral acceleration dead band $\alpha_{00}$ or the lateral acceleration negative region $\alpha_-$), the over data is cleared (step S17), and the program returns to step S3. In step S4 after the over data has been cleared, because no control input calculated based on the lateral acceleration $\alpha$ is set, i.e. the control input buffer has been cleared in step S5, the damper 4 is controlled to perform soft damping.

If the answer in step S14 is NO (the over data is not positive over data), steps S14A to S17A corresponding to steps S14 to S17, and step S18 are executed. In step S14A, an inquiry is made as to whether or not the over data is negative over data.

If the answer in step S14A is YES (the over data is negative over data), an inquiry is made in step S15A as to whether or not the lateral acceleration $\alpha$ is displaced from the lateral acceleration dead band $\alpha_{00}$ in the negative direction (the lateral acceleration $\alpha$ falls within the lateral acceleration negative region $\alpha_-$).

If the answer in step S15A is YES (the lateral acceleration $\alpha$ falls within the lateral acceleration negative region $\alpha_-$), the damping force negative shift amount VALM is adopted as a control input, and is stored in the control input buffer (step S16A). Then, the program returns to step S3.

If the answer in step S15A is NO (the lateral acceleration $\alpha$ falls within the lateral acceleration dead band $\alpha_{00}$ or the lateral acceleration positive region $\alpha_+$), the over data is cleared (step S17A), and the program returns to step S3.

If the answer in step S14A is NO (the over data is not negative over data), the over data is cleared (step S18), and the program returns to step S3.

An operation of the suspension control apparatus arranged as mentioned above is explained below, with reference to a time chart of FIG. 7.

Figure 7:
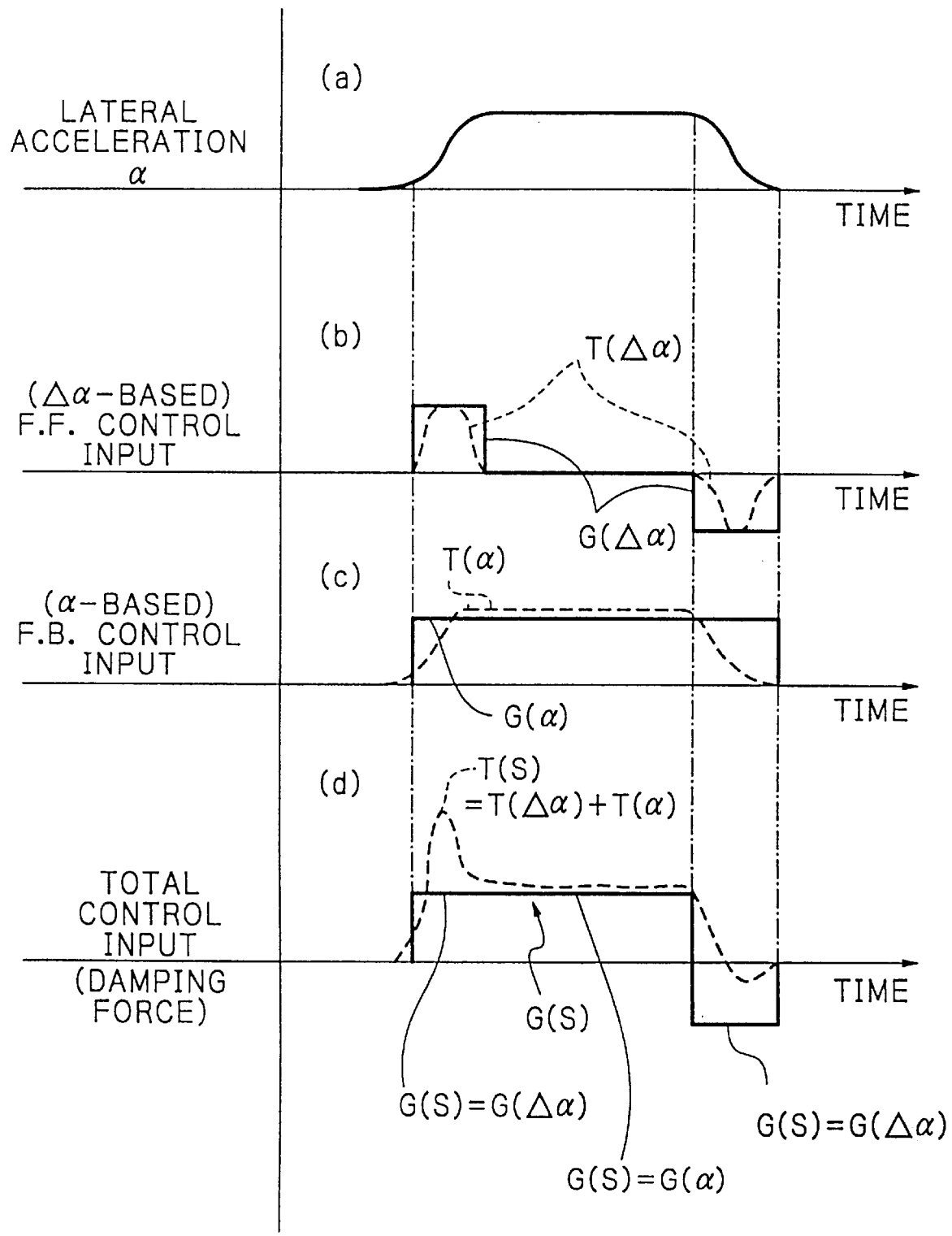
FIG. 7 is a time chart explaining an operation of the suspension control apparatus according to the first embodiment of the present invention in comparison with an operation of a conventional suspension control apparatus.

When the vehicle is in rolling condition during turning, and the lateral acceleration $\alpha$ varying as shown in graph (a) of FIG. 7 has been detected by the lateral acceleration sensor 5, the lateral acceleration $\alpha$ is inputted to the control input determining device 13, and the differentiator 12 determines the lateral acceleration differential value $\Delta\alpha$ by differentiating the lateral acceleration $\alpha$ shown in graph (a) of FIG. 7. This lateral acceleration differential value $\Delta\alpha$ is inputted to the control input determining device 13. When the lateral acceleration differential value $\Delta\alpha$ exceeds the differential value dead band $\Delta\alpha_{00}$ (which is likely to occur immediately after the start of rolling motion of the vehicle due to, for example, a curve turning), that is, when the answer in step S8 is YES, the damping force positive shift amount VALP is determined as a control input, and is stored in the control input buffer (step S9).

By storing the damping force positive shift amount VALP in the control input buffer as a control input, in the subsequent control cycle, a control input [such as indicated by a solid line $G(\Delta\alpha)$ in graph (b) of FIG. 7] determined based on the differential value $\Delta\alpha$ which was calculated in the previous control cycle is outputted to the actuator 10 (step S4), to thereby enable the damper 4 to generate a damping force corresponding to the control input, as indicated by the solid line G(S) in graph (d) of FIG. 7.

When the rate of change in lateral acceleration a (lateral acceleration differential value $\Delta\alpha$) of the vehicle lowers during turning, and the differential value $\Delta\alpha$ reaches the differential value dead band $\Delta\alpha_{00}$ (the answer in step S8 is NO and the answer in step S11 is NO) and the lateral acceleration $\alpha$ is displaced from the lateral acceleration dead band $\alpha_{00}$ in the positive direction (the answer in step S15 is NO), a control input [such as indicated by a solid line $G(\alpha)$ in graph (d) of FIG. 7] determined in accordance with the lateral acceleration $\alpha$ is outputted to the actuator 10 (step S4), to thereby enable the damper 4 to generate a damping force corresponding to the control input, as indicated by the solid line G(S) in graph (d) of FIG. 7.

When the turning of the vehicle nearly ends, and the lateral acceleration $\alpha$ lowers (the lateral acceleration differential value $\Delta\alpha$ becomes negative) and the differential value $\Delta\alpha$ is displaced from the differential value dead band $\Delta\alpha_{00}$ in the negative direction (the answer in step S11 is YES), the damping force negative shift amount VALM is determined as a control input, and is stored in the control input buffer (step S13).

By storing the damping force negative shift amount VALM in the control input buffer as a control input, in the subsequent control cycle, a control input [such as indicated by the solid line G($\Delta\alpha$) in graph (b) of FIG. 7] determined based on the differential value $\Delta\alpha$ which was calculated in the previous control cycle is outputted to the actuator 10 (step S4), to thereby enable the damper 4 to generate a damping force corresponding to the control input, as indicated by the solid line G(S) in graph (d) of FIG. 7.

In the above-mentioned conventional suspension control apparatus, two control inputs, namely, the control input varying in proportion to the lateral acceleration $\alpha$ and the control input varying in proportion to the lateral acceleration differential value $\Delta\alpha$, are added to thereby determine a total control input, and the actuator 10 is operated, based on the total control input. Therefore, immediately after the start of rolling and just prior to the end of rolling, the damping force sharply increases, and then decreases immediately. Such a rapid change in damping force imparts so-called stepping feel on running of the vehicle, leading to queer and uncomfortable feel of an occupant of the vehicle. On the other hand, in the above embodiment of the present invention, immediately after the start of rolling and just prior to the end of rolling, the actuator 10 is operated in accordance with the control input determined based on the lateral acceleration differential value $\Delta\alpha$, and during a period of time between immediately after the start of rolling and just prior to the end of rolling, the actuator 10 is operated in accordance with the control input determined based on the lateral acceleration $\alpha$. Therefore, the ride and steering stability of the vehicle can be maintained at a satisfactory level even during turning. Further, by setting the F. F. control input and the F. B. control input to the same value, variations in control input can be prevented.

Figure 8:
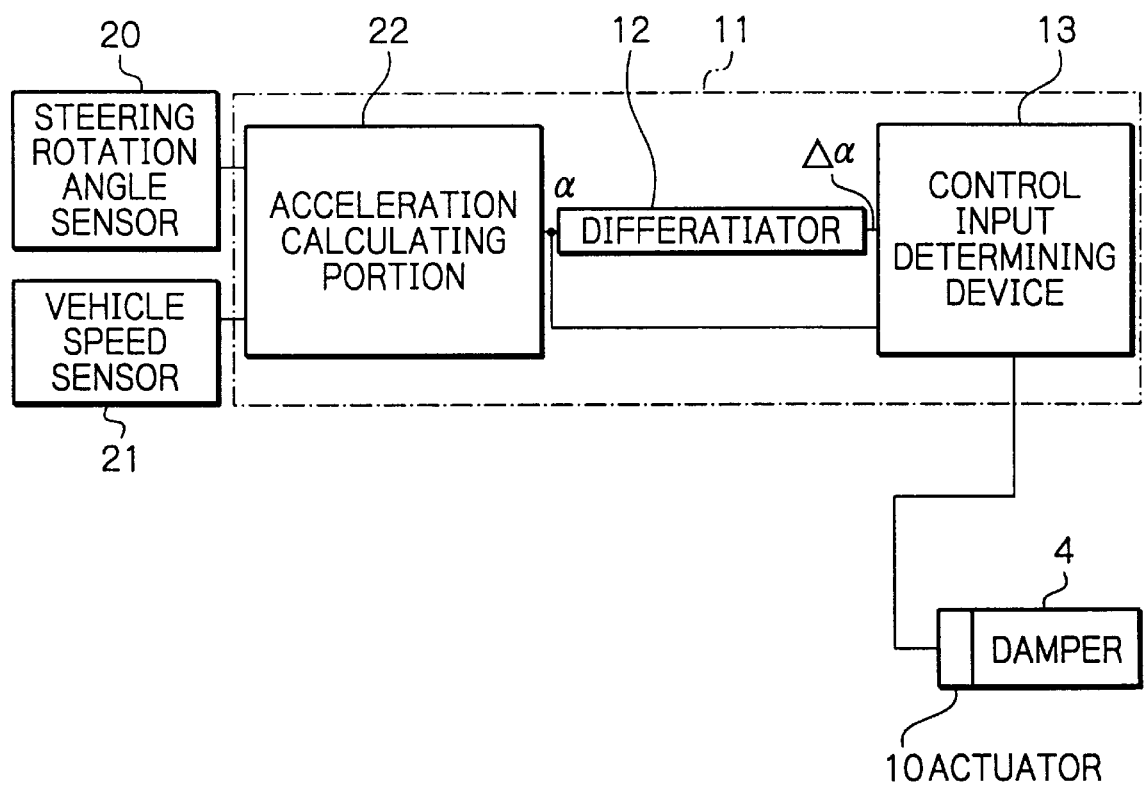
FIG. 8 is a block diagram showing another example of the controller, in connection with calculation of the lateral acceleration.

In the above embodiment of the present invention, the lateral acceleration sensor 5 is provided so that the lateral acceleration $\alpha$ detected by the lateral acceleration sensor 5 is utilized. However, in the present invention, instead of the lateral acceleration sensor 5, a steering rotation angle sensor 20 for detecting a steering rotation angle and a vehicle speed sensor 21 for detecting a running speed of the vehicle may be provided as shown in FIG. 8 so that the lateral acceleration $\alpha$ is calculated from the detection data (steering rotation angle and running speed of the vehicle) from the steering rotation angle sensor 20 and the vehicle speed sensor 21 at an acceleration calculating portion 22. In this case, the lateral acceleration detecting means comprises the steering rotation angle sensor 20, the vehicle speed sensor 21 and the acceleration calculating portion 22.

Figure 9:
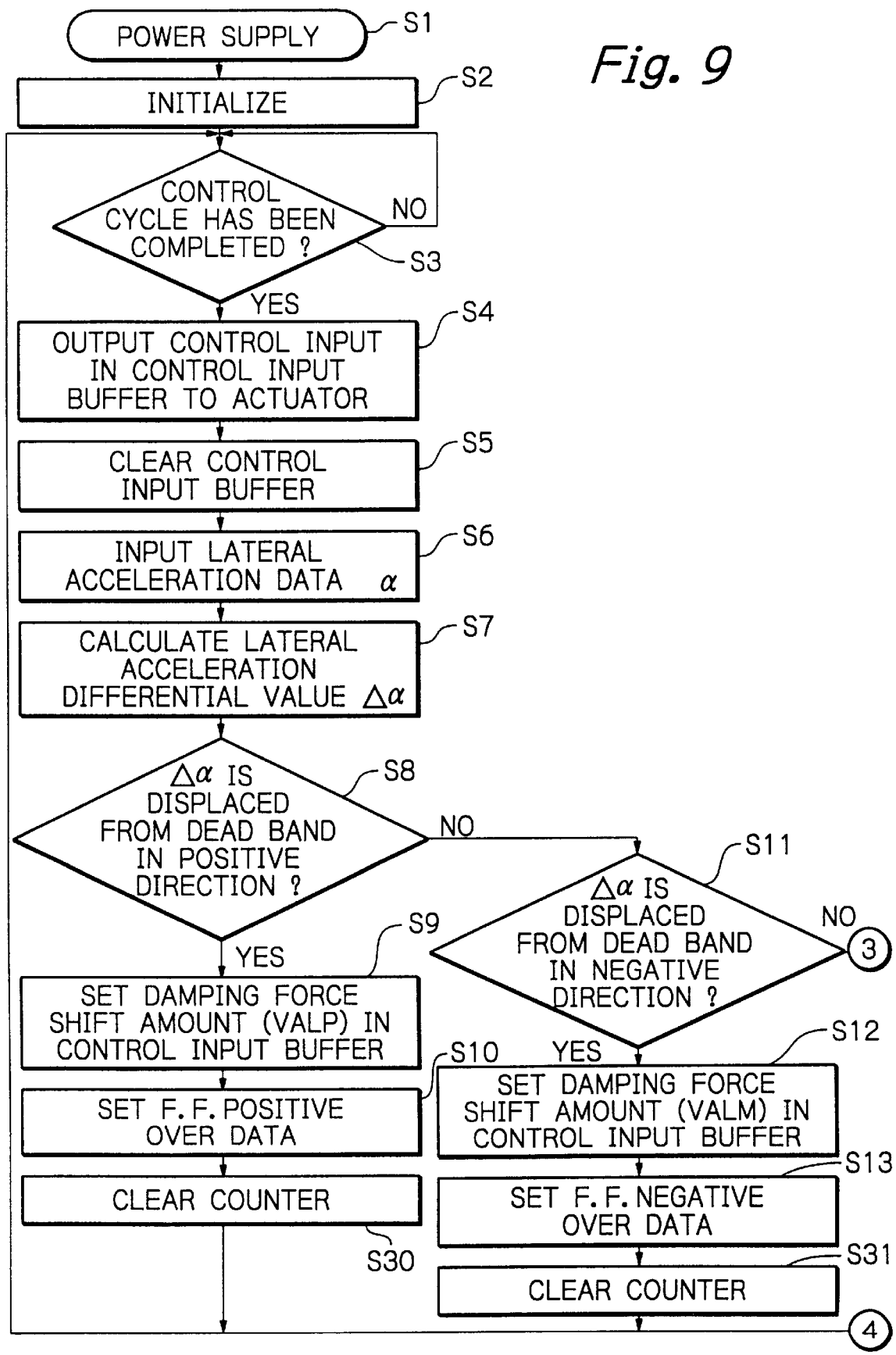
FIG. 9 is a flow chart showing the content of processing by a controller of a suspension control apparatus according to a second embodiment of the present invention.
Figure 10:
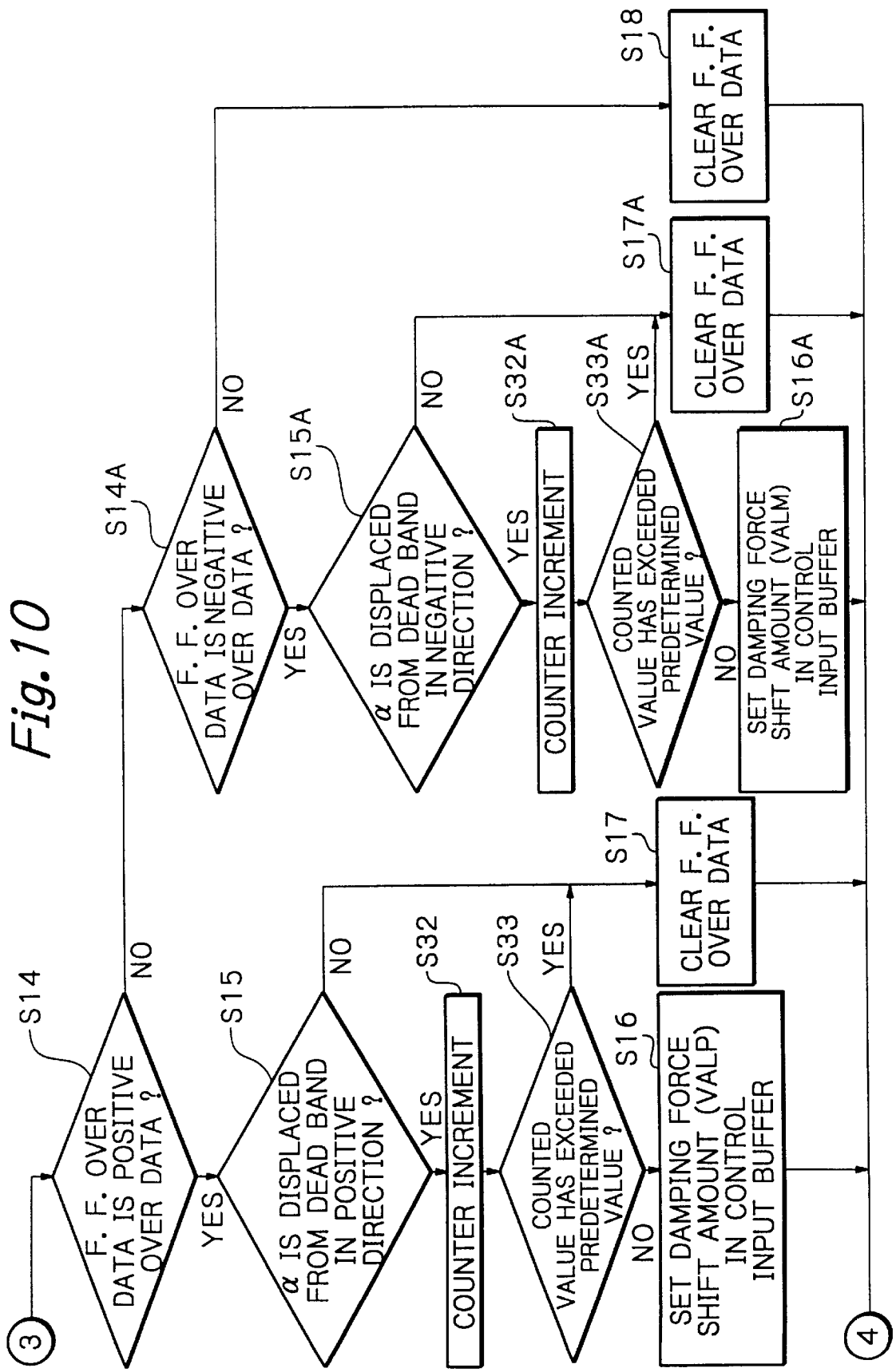
FIG. 10 is a flow chart continued from the flow chart of FIG. 9.
Figure 11:
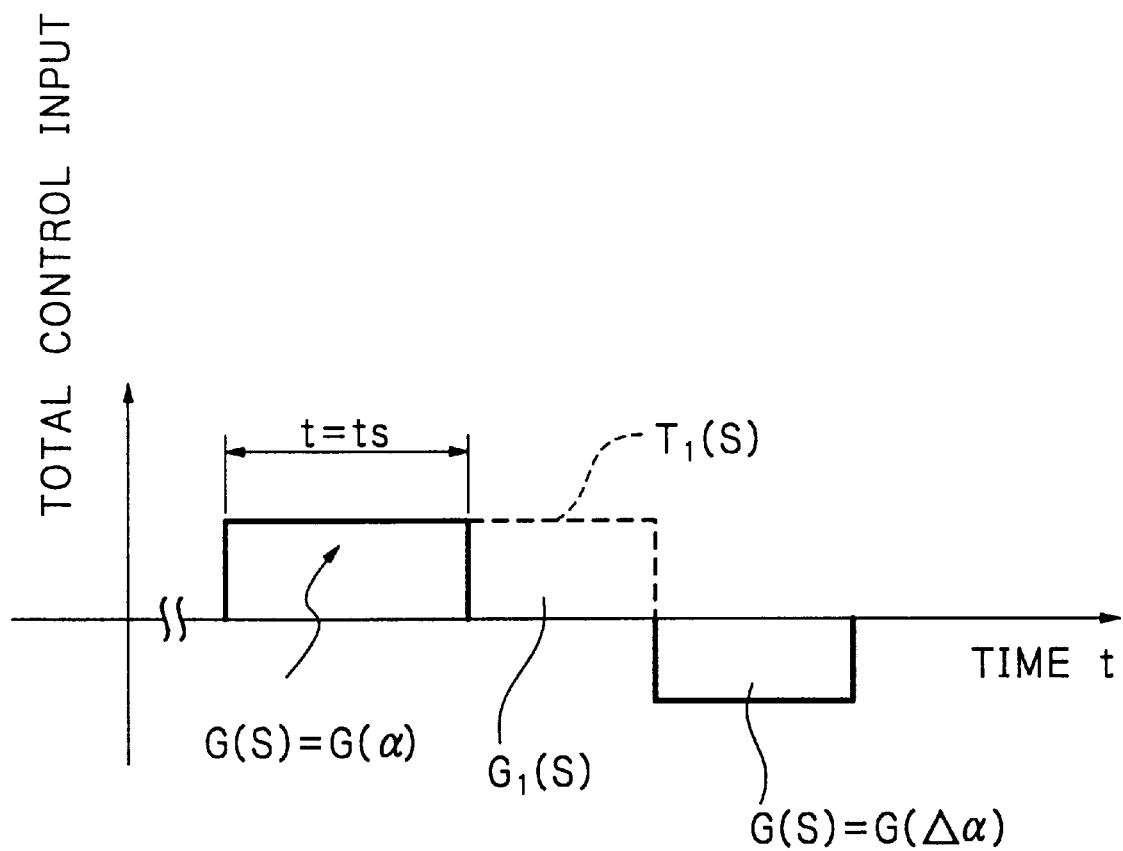
FIG. 11 is a time chart explaining an operation of the suspension control apparatus according to the second embodiment of the present invention.

Next, explanation is made on a suspension control apparatus according to a second embodiment of the present invention, with reference to FIGS. 9 to 11, in addition to FIGS. 3, 4, 6 and 7. The second embodiment generally differs from the first embodiment in that as shown in FIGS. 9 and 10, steps S30 to S33 are added as compared to the processing shown in FIGS. 3 and 4. Further, the second embodiment differs from the first embodiment in that in adjustment of a damping force based on the lateral acceleration $\alpha$ after adjustment of the damping force based on the lateral acceleration differential value $\Delta\alpha$, the damper 4 is controlled to perform soft damping [as indicated by a solid line $G_1(S)$ instead of a dotted line $T_1(S)$ in FIG. 11] after a predetermined period of time.

In FIGS. 9 and 10, step S30 is executed after step S10, and step S31 is executed after step S13. In each of steps S30 and S31, a counted value of a counter (explained later) is cleared.

Steps S32 and S33 are provided between steps S15 and S16, and steps S32A and S33A are provided between steps S15A and S16A.

Step S32 is executed if the answer in step S15 is YES (the lateral acceleration $\alpha$ falls within the lateral acceleration positive region $\alpha_+$) (that is, if the lateral acceleration differential value $\Delta\alpha$ falls within the differential value dead band $\Delta\alpha_{00}$ and the lateral acceleration $\alpha$ falls within the lateral acceleration positive region $\alpha_+$, because step S32 is executed after the answers in step S8 and step S11 are NO). In step S32, the counter (not shown) for conducting measurement of time counts at each control cycle.

After step S32, step S33 is executed. In step S33, an inquiry is made as to whether or not a counted value (time t) of the counter has exceeded a predetermined value (time $t_s$). If the answer in step S33 is NO, the program advances to step S16, in which the damping force positive shift amount VALP is determined as a control input, and is stored in the control input buffer. If the answer in step S33 is YES, the program advances to step S17, in which the over data is cleared, and the control input indicated by the solid line $G_1(S)$ in FIG. 11 is inputted to the actuator 10, instead of the control input indicated by the dotted line $T_1(S)$ in FIG. 11, to thereby control the damper 4 to perform soft damping. Thus, unevenness of a road surface is compensated for by the damper 4 during turning of the vehicle, to thereby provide the vehicle with a satisfactory ride.

Step S32A is executed if the answer in step S15A is YES (the lateral acceleration $\alpha$ falls within the lateral acceleration negative region $\alpha_-$) (that is, if the lateral acceleration differential value $\Delta\alpha$ falls within the differential value dead band $\Delta\alpha_{00}$ and the lateral acceleration $\alpha$ falls within the lateral acceleration negative region $\alpha_-$, because step S32A is executed after the answers in step S8 and step S11 are NO). In step S32A, the counter (not shown) counts at each control cycle. After step S32A, step S33A is executed. In step S33A, the same processing as that in step S33 is performed. If the answer in step S33A is NO, the program advances to step S16A, in which the same processing as that in step S16 is performed. If the answer in step S33A is YES, the program advances to step S17A, in which the over data is cleared as in the case of step S17, and the damper 4 is controlled to perform soft damping. Thus, unevenness of a road surface is compensated for by the damper 4 during turning of the vehicle, to thereby provide the vehicle with a satisfactory ride.

Thus, in the first embodiment of the present invention, when the lateral acceleration differential value falls outside the lateral acceleration differential value range, that is, when the lateral acceleration differential value becomes large immediately after the start of rolling motion of a vehicle during turning and just prior to the end of the rolling motion of the vehicle, the controller controls the actuator by way of a preference setting such that a control input for the actuator is calculated based on the lateral acceleration differential value, in preference to the lateral acceleration. Therefore, it is possible to suppress any uncomfortable sensation which is likely to be transmitted to an occupant of the vehicle immediately after the start of rolling and just prior to the end of rolling in the conventional technique in which the control input for the actuator is calculated by adding the control input varying in proportion to the lateral acceleration and the control input varying in proportion to the lateral acceleration differential value.

In the second embodiment of the present invention, the control input for the actuator is set so as to enable the damper to perform soft damping, while the preference setting of the control input for the actuator is canceled. Therefore, it is possible to avoid a situation that the preference setting of the control input for the actuator is canceled and the damper continues to perform firm damping for an extended period during turning of the vehicle, thus ensuring a satisfactory ride.

The entire disclosure of Japanese Patent Application No. Hei 10-86636 filed on Mar. 31, 1998 is incorporated herein by reference in its entirety.

What is claimed is:

1. A suspension control apparatus comprising:

an actuator for controlling a damper provided in a vehicle, said damper being adapted to generate a variable damping force;

lateral acceleration detecting means for detecting a lateral acceleration of the vehicle; and a controller having lateral acceleration differential value calculating means, said lateral acceleration differential value calculating means determining a lateral acceleration differential value by differentiating the lateral acceleration detected by said lateral acceleration detecting means, said controller controlling said actuator, based on the lateral acceleration and the lateral acceleration differential value, wherein when the lateral acceleration differential value determined by said lateral acceleration differential value calculating means falls outside a predetermined lateral acceleration differential value range, said controller controls the actuator by way of a preference setting such that a control input for the actuator is calculated based on the lateral acceleration differential value, in preference to the lateral acceleration.

2. A suspension control apparatus according to claim 1, wherein when the lateral acceleration differential value determined by said lateral acceleration differential value calculating means falls within the predetermined lateral acceleration differential value range and the lateral acceleration detected by said lateral acceleration detecting means falls outside a predetermined lateral acceleration range, measurement of time is conducted and when a value measured by the measurement of time reaches a predetermined value, the control input for the actuator is set so as to enable the damper to perform soft damping, while said preference setting with respect to the lateral acceleration differential value of the control input for the actuator is canceled.

* * * * *